Oct. 16, 1934.  F. E. WOLCOTT  1,977,364
HANDLE FOR COFFEE MAKERS AND THE LIKE
Filed March 24, 1932  2 Sheets-Sheet 1
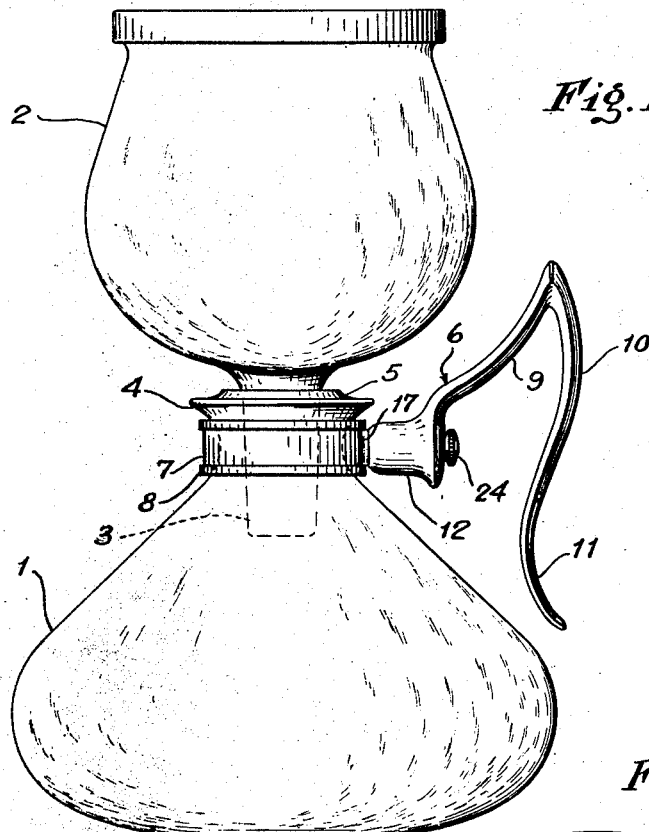
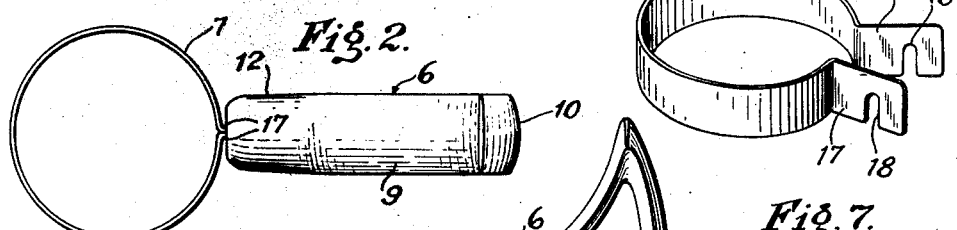
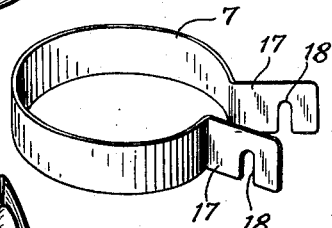
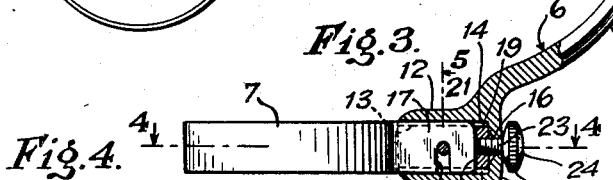
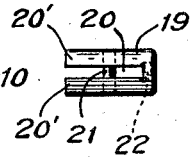
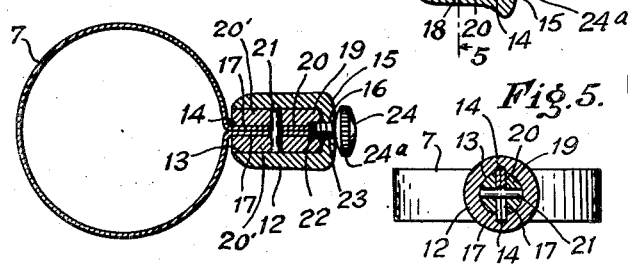
INVENTOR
FRANK E. WOLCOTT
BY
ATTORNEY.

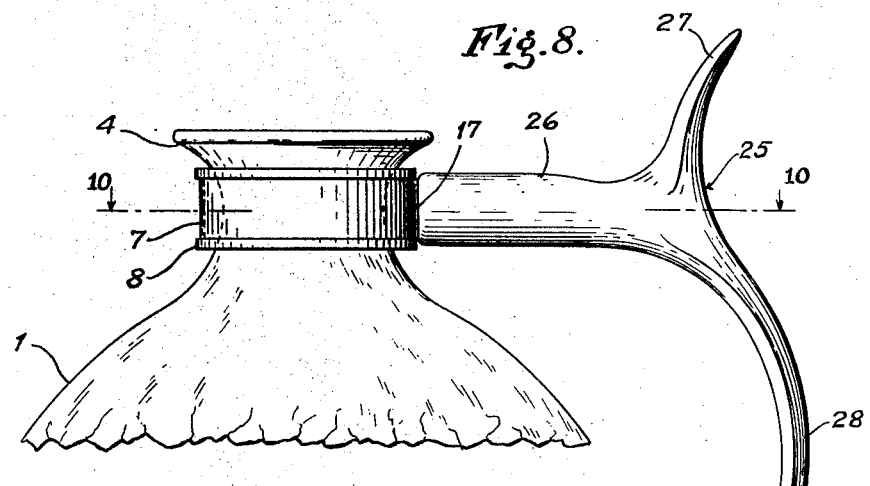
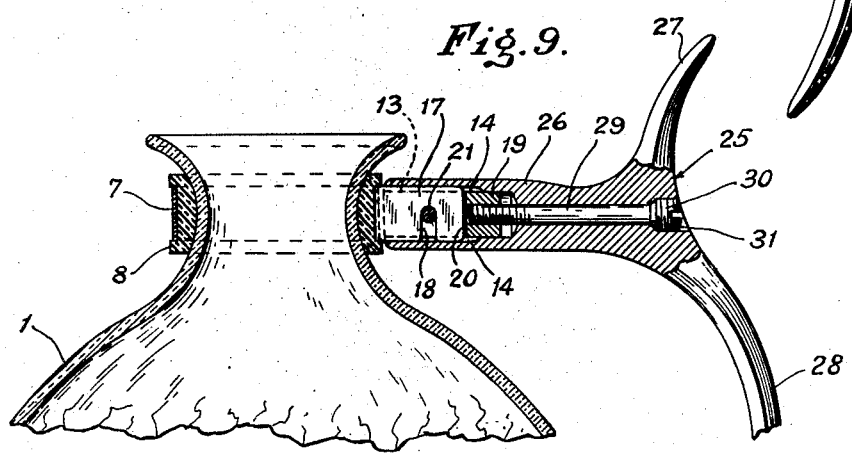
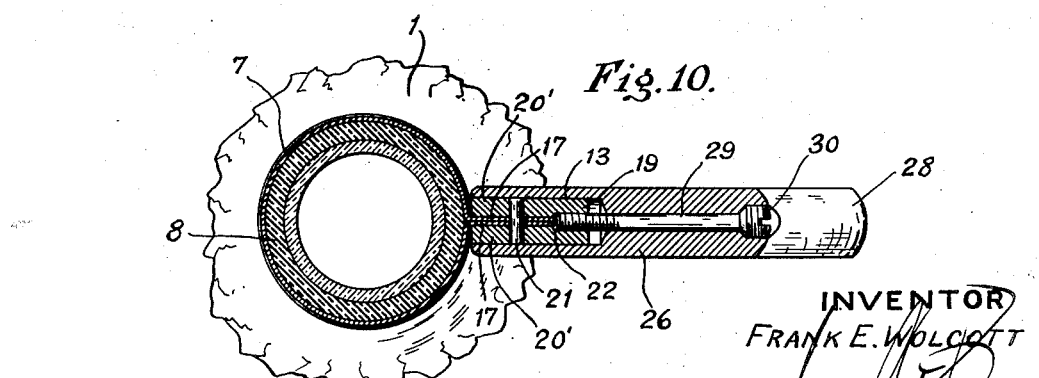

Patented Oct. 16, 1934

1,977,364

UNITED STATES PATENT OFFICE 1,977,364

HANDLE FOR COFFEE MAKERS AND THE LIKE

Frank E. Wolcott, West Hartford, Conn., assignor to The Silex Company, a corporation of Connecticut Application March 24, 1932, Serial No. 600,930

28 Claims. (Cl. 53—3)

My invention relates to handles for coffee makers and the like.

It has among its objects to provide an improved handle, and, more particularly, to provide such a handle especially adapted to use with a coffee maker and providing improved means for handling the latter. A further object of my invention is to provide an improved handle especially adapted to be carried on the neck of the lower bowl of a coffee maker and having an improved neck engaging portion and an improved handle portion, and improved means for connecting or disconnecting the same. These and other objects and advantages of my improved construction will, however, hereinafter more fully appear.

In the accompanying drawings I have shown for purposes of illustration one embodiment which my invention may assume in practice.

In these drawings,—

Figure 1 is a side elevation of a coffee maker equipped in accordance with my improvement, the usual inner strainer mechanism being omitted to facilitate illustration;

Fig. 2 is a detail plan view of the handle;

Fig. 3 is a side elevation of the same partially in vertical section to show the connecting means;

Fig. 4 is a horizontal sectional view on line 4—4 of Figure 3;

Fig. 5 is a vertical section on line 5—5 of Figure 3;

Fig. 6 is a perspective view of the resilient clamping member;

Fig. 7 is a side elevation of the holding clip;

Fig. 8 is a side elevation of a modified construction, the same being shown applied to a different form of bowl, and the latter being broken away to facilitate illustration;

Fig. 9 is a partial vertical sectional view through the handle and bowl shown in Figure 8, and Fig. 10 is a transverse sectional view on line 10—10 of Figure 8.

In the illustrative construction shown in Figures 1 to 7, my invention is applied to use in connection with a coffee maker of the type comprising a lower bowl 1 and upper bowl 2 having a stem 3 received in the neck 4 of the lower bowl and passing through a seal 5 therein, while an improved handle, generally designated at 6, has an improved resilient clamp 7 seated in an externally grooved soft rubber washer 8 on the outside of the neck of the bowl 1, and improved connections to said clamp 7, all as hereinafter more fully described.

Referring more particularly to the handle generally designated 6, it will be noted that the same is provided with an upwardly and laterally extending portion 9. As shown, this portion 9 slopes upwardly at an angle away from the neck of the bowl 1 from a point spaced laterally from the neck and herein also curves away in substantial conformation with the curved side of the bowl 2. Herein, it is also provided as its upper end and at a point substantially above the neck of the bowl 1, with a depending grasping portion 10 extending downward and preferably slightly laterally away in a curve from the portion 9 in such manner as to provide finger room between these portions. In a preferred construction, it is also provided with a curved lower end 11 on the portion 10, herein reversely curved away from the side of the bowl 1 in such manner as to be spaced therefrom.

Thus, it will be noted that not only are the portions 9, 10 and 11 effectually spaced from the upper bowl 2 and the lower bowl 1 in such manner as to be kept cool, but that a handle is provided having a high supporting point tending to facilitate holding the assembled coffee maker in the desired vertical position. Further, it will be noted that after the coffee has been made and the bowl 2 has been removed, the handle provides a similar high and effective supporting means for the bowl 1 which then becomes the pouring bowl. It will also be noted that the handle may be readily grasped and securely held as, for example, by grasping it from the side with fingers between the portion 10 and the portion 9 and with the forefinger or thumb, or both, over the top of the portion 9. It will also be noted that when the bowl is so held, the acute angle formed by the junction of the portions 9 and 10 provides, in effect, a pivot point well above the bowl neck and at one side of the centre of gravity of the bowl so that the weight of the bowl 1 with the coffee therein tends to swing the bowl down and to the left from the position shown in Figure 1, i. e. toward pouring position. Moreover, with the finger or thumb engageable with the peaked extremity of portions 9 and 10, an effective control may be maintained at the same time that it is made possible to pivot the bowl readily about the hand into elevated or non-pouring position. Here attention is also directed to the fact that due to the restricted neck on the bowl, accidental loss of liquid during these operations is minimized while, due to the inclined upper sides of the bowl, it is possible to empty the bowl completely with only a limited pouring movement. Also, it will be observed that, if desired, one or more fingers of the hand may be disposed behind the portion 11 on the handle, in such manner that the hand may be effectually prevented from coming in contact with the bowl in any position of the latter while still holding the handle securely.

Referring to the connection of the handle 6 to the resilient band 7, it will be noted that these are separate elements herein and that improved connecting means are provided enabling the parts to be readily connected or disconnected at will while providing a rigid construction adapted to hold the bowl 1 securely. More particularly, it will be observed that the handle 6 is provided with a horizontally extending enlargement 12 at the base of its portion 9 and extending toward the bowl neck. This herein is provided with a cylindrical horizontal socket or bore 13 having grooves 14 in the top and bottom thereof and located opposite one another, and a rear vertical wall 15 provided with an axial aperture 16. Moreover, it will be noted that the band 7 is open and provided with lateral extensions 17 at its ends adapted to abut one against the other and each provided with an upwardly extending slot 18, herein slightly nearer its outer end. It will also be observed that a generally cylindrical holding member 19 has a vertical slot 20 in its inner end and extending substantially to its outer end which receives the ends 17 when the same are pressed together. Attention is also directed to the fact that this slot 20 forms elongated parallel spaced portions 20' on the member 19 which extend out into adjacency to the portions of the band 7 adjacent the extensions 17 and thus effectually stiffen the construction while also preventing lateral bending of these extensions when the handle is in use. Herein, this member 19 also has a transverse pin 21 extending across the slot between the ends thereof and adapted to be entered from the bottom into the vertical slots 18 in the portions 17 on the spring when the top of the rear end of the slot 20 in the member 19 is engaged with the ends 17 and pivoted about its point of engagement therewith. As shown, this slot and pin arrangement is also symmetrically disposed so that the member 19 is connectible as described even if reversed. Herein, the member 19 also has a threaded axial aperture 22 in its rear end adapted to be aligned with the aperture 16 when the member 19 is in holding position and receive the threaded end 23 of an axial holding screw 24 projecting out under the inner end of the portion 9 of the handle.

In the use of this construction, it will be evident that with the parts assembled as described, a rigid handle structure is provided, the parts of which are so connected and interlocked as, in effect, to constitute a single rigid structure. More particularly, the portions 17 are interlocked with the holding member 19 and with the portion 12 through the slots 14 in the bore of the latter, while the members 19 and 12 are also connected by the screw threaded member 23, and lateral bending of the portions 17 is prevented by the portions 20'. It will also be observed that whenever desired, it is possible to disconnect the parts with facility, it simply being necessary to remove the member 23 by manipulating its head 24a, then withdraw the portion 12 and press down the portion 19 to release its pin 21 from the slots 18 and free the clamp 7. Similarly, in assembling the parts, when the portions 17 are brought together, the part 19 can be readily inserted from below with its pin 21 in the slots 18, and the member 12 may then be slipped longitudinally in position and the screw connected.

In Figures 8, 9 and 10, I have illustrated a modified handle construction having a different grasping portion, but essentially similar to that heretofore described as regards the connections to the bowl neck. More particularly, it will be noted that herein the handle, generally designated at 25, is provided with a shank portion 26 corresponding to the portion 12 but substantially elongated as compared with the latter in such manner as to space the handle grasping portion a substantially greater distance from the bowl neck. Moreover, it will be noted that the handle 25 has at its upper end an upstanding, single, relatively short, curved peak or prong 27 and a longer depending portion 28 extending downward from the shank and slightly inward, as shown. It will also be noted that an elongated screw 29 is provided corresponding generally to the screw 23 heretofore described but adapted to use with the longer shank and also having its head 30 wholly housed in a corresponding aperture 31 in the handle 25. Obviously, this construction will be usable in substantially the same manner as that previously described, with the hand grasping the portion 28 and utilizing the peak 27 for control purposes, although it obviously will not produce the high pivoting point obtainable in my previously described construction.

As a result of my improved construction, it will also be observed that it is made possible to produce a construction which may be very economically provided. Further, it will be noted that this construction does not require any welding or soldering of the parts. Attention is further directed to the fact that while the various operative and structural advantages herein brought out are obtained, it is also possible to produce a construction of light and attractive appearance, especially adapted to use in connection with glassware and on a table or the like. These and other advantages of my improved construction will, however, be clearly apparent to those skilled in the art. This application is a continuation in part of my application, Serial No. 532,250, filed April 23rd, 1931.

While I have in this application specifically described one embodiment which my invention may assume in practice, it will be understood that the same is shown for purposes of illustration, and that the invention may be modified and embodied in various other forms without departing from its spirit or the scope of the appended claims.

What I claim as new and desire to secure by Letters Patent is:—

1. In a handle, a grasping portion having a socket member rigidly connected therewith, a neck grasping member having free ends protruding into said socket member and interlocked therewith, and means for rigidly connecting the parts.

2. In a handle, a grasping portion having a longitudinally grooved socket member rigidly connected therewith, a neck grasping normally open spring member having normally spaced laterally projecting free ends receivable in a groove in said socket member, and means for rigidly connecting the parts.

3. In a handle, a grasping portion having socket forming means rigidly connected thereto, neck grasping means having ends, holding means for said ends receiving the same and seated in said socket forming means, and means for rigidly connecting the parts.

4. In a handle, a grasping portion having a socket member rigidly connected thereto and projecting laterally relative thereto, a neck grasping member having ends, means receiving said ends and seated in said socket member and interlocked therewith, and means for connecting said ends against longitudinal separation relative to said socket member.

5. In a handle, a grasping portion having a socket member, a neck grasping member having free ends, and a holding member interlocking with said ends and itself seated in said socket member and fixed thereto.

6. In a handle, a grasping portion having a socket member, a neck grasping member having free ends, a holding member in said socket member interlocking with said ends and itself interlocked by the latter with said socket member, and means for connecting said holding member and socket member.

7. In a handle, a grasping portion having a socket member, a neck grasping ring member having free ends projecting into said socket member, means including a holding member seated in said socket member for interlocking said ends against both rotation and longitudinal withdrawal relative to said holding member, and means for fixing said holding member in said socket member.

8. In a handle, a grasping portion having a socket, a neck grasping member having free ends receivable within said socket, and connecting means located within said socket having a releasable interlocking connection with said ends and also having a releasable interlocking connection with said socket and co-operating to interlock said ends both against withdrawal from said socket and also against rotation therein.

9. In a handle, a grasping portion having a socket member, a neck grasping ring member having free outstanding ends projecting into said socket member, means including an interlocking member seated in said socket member and interlocked with said ends, and means releasably connecting said interlocking member and socket.

10. In a handle, a grasping portion having a socket member, a neck grasping ring member having free ends provided with notches, a holding member enclosed in said socket member having a slot receiving said ends when abutting and having means disposable in said notches, and means for connecting said holding and socket members.

11. In a handle, a grasping portion having a socket member, a neck grasping ring member having free ends disposed in the latter and provided with slots, a holding member having a slot receiving said ends and having a pin received in the slots in said ends, and means for rigidly connecting the parts to said socket member.

12. In a handle, a grasping portion having a socket member, a neck grasping ring member having free ends disposed in the latter and provided with slots, a holding member having a slot receiving said ends and having a pin received in the slots in said ends, and means for rigidly connecting the parts to said socket member comprising grooves in said socket member receiving the edges of said ends and an axial member connecting said holding member to said socket member.

13. In a handle, a grasping portion having a socket member projecting laterally relative thereto, a spring ring having abutting slotted ends, a holding member receivable in said socket having a slot receiving said ends and portions on opposite sides of said slot extending to adjacent the body of the spring ring, and means for rigidly connecting said holding member in said socket.

14. A receptacle neck grasping unit which comprises a resilient ring having laterally projecting end portions, a clamping member for said end portions, and a slot and pin connection between said end portions and said member.

15. A receptacle neck grasping member which comprises a resilient ring, normally spaced laterally projecting end portions on said ring, and a slot in each of said end portions.

16. A clamping member which comprises a substantially cylindrical body having a slot longitudinally disposed therein, a pin transversely disposed therethrough across said slot, and an axial aperture through said body.

17. In a handle, a grasping portion, a socket member integral therewith and spaced therefrom having a cylindrical bore extending partially through said member from one end thereof, and parallel grooves disposed in the wall of said core at diametrically opposite portions thereof.

18. In a handle, an upright grasping portion having a portion depending from a point substantially opposite the upper end of said grasping portion, a receiving portion at the lower end of said depending portion, neck grasping means received in said receiving portion, means in said receiving portion for interlocking the same against rotation relative to said neck grasping means, and means for connecting or disconnecting the latter at the lower end of said depending portion.

19. In a handle, an upright grasping portion having a portion depending from a point substantially opposite the upper end of the grasping portion, a receiving portion at the lower end of said depending portion, neck grasping means received in said receiving portion, means in said receiving portion interlocking the same against rotation relative to said neck grasping means and means for connecting or disconnecting the latter at the lower end of said depending portion, said depending portion being angularly disposed relative to said grasping portion and providing a balancing point above the lower end thereof.

20. In a handle, an upright grasping portion having a portion depending from a point substantially opposite its upper end and a socket portion on the lower end of said last mentioned portion, a neck grasping connection terminating in said socket portion, means in said socket portion interlocking the same against rotation relative to said connection, and means carried by said socket portion for connecting or disconnecting said neck grasping connection at will.

21. In a handle, an upright grasping portion having a portion depending from a point substantially opposite its upper end and a socket portion on the lower end of said last mentioned portion, a neck grasping connection, and means for connecting or disconnecting the same at will carried by said socket portion comprising a neck grasping band having ends protruding into said socket portion and means for connecting said ends to the latter.

22. In a handle, an upright grasping portion having an upward projection at its top and a laterally extending portion intermediate its ends provided with a socket in its free end integral therewith, a neck grasping member having ends receivable in said socket, means in said socket interlocking the same against rotation relative to said neck grasping member, and interlocking means releasably connecting said ends to said sockets.

23. In a handle, an upright grasping portion having an upward projection at its top and a laterally extending portion intermediate its ends provided with a socket in its free end, a neck grasping member having ends receivable in said socket, and means for connecting or disconnecting said ends in said socket comprising a holding member seated in said socket and interlocked with said ends and said socket.

24. In combination, a pouring bowl for coffee makers having a neck, a handle support carried on said neck, a grasping portion carried by said support and providing a pivot forming means at one side of and above said neck, and releasable interlocking means connecting said support and portion inhibiting angular movement of said portion relative to said support.

25. In combination, a pouring bowl for coffee makers having a neck, a handle support carried on said neck, a grasping portion carried by said support at one side thereof and providing a pivot forming means above and laterally spaced from said neck comprising upwardly and downwardly extending portions joining above the level of said neck, and releasable connecting means for said support and portion having interlocking means preventing lateral movement of one relative to the other.

26. In combination, a pouring bowl for coffee makers having a restricted neck and straight inclined upper sides leading thereto, a handle supporting portion carried on said neck, a grasping portion carried by said portion having a socket adjacent said neck and providing a pivot forming means above and at one side of said neck facilitating emptying of said bowl, and means located within said socket interlocking said portions against movement relative to each other.

27. In a coffee maker, a lower bowl having a neck, an upper bowl seated in said neck, a handle support on the neck of said lower bowl presenting laterally extended attaching means, a grasping portion on said suport providing a balancing point disposed above said neck and adjacent the bottoms of said upper bowl, and a connection between said support and grasping portion having interlocking means therein for inhibiting both lateral separating movement and angular rotating movement therebetween.

28. In a coffee maker, a lower bowl having a neck, an upper bowl seated in said neck, a handle support on said neck, a grasping portion on said support having an upwardly projecting portion above the neck and spaced from the upper bowl and a depending portion co-operating with said portion to provide a balancing point above said neck and depending from the upper end of said portion and spaced from the lower bowl, and a connection between said support and grasping portion having interlocking means therein for inhibiting both lateral separating movement and angular rotating movement therebetween.

FRANK E. WOLCOTT.